United States Patent
He et al.

(10) Patent No.: US 12,366,959 B2
(45) Date of Patent: Jul. 22, 2025

(54) DATA COMPRESSION FOR MAPPING TABLES

(71) Applicant: Micron Technology, Inc., Boise, ID (US)

(72) Inventors: Deping He, Boise, ID (US); Wenjun Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/610,028

(22) Filed: Mar. 19, 2024

(65) Prior Publication Data

US 2024/0345727 A1 Oct. 17, 2024

Related U.S. Application Data

(60) Provisional application No. 63/459,365, filed on Apr. 14, 2023.

(51) Int. Cl.
*G06F 3/06* (2006.01)
*G06F 12/02* (2006.01)

(52) U.S. Cl.
CPC .......... *G06F 3/0608* (2013.01); *G06F 3/0659* (2013.01); *G06F 3/0679* (2013.01); *G06F 12/0246* (2013.01); *G06F 2212/7201* (2013.01)

(58) Field of Classification Search
CPC .... G06F 3/0608; G06F 3/0659; G06F 3/0679; G06F 12/0246; G06F 2212/1044; G06F 2212/7201; G06F 2212/7204
See application file for complete search history.

(56) References Cited

U.S. PATENT DOCUMENTS

| | | | |
|---|---|---|---|
| 10,831,652 B2 * | 11/2020 | Lee | G06F 12/0292 |
| 11,263,147 B2 * | 3/2022 | Miura | G06F 12/1009 |
| 2021/0349829 A1 * | 11/2021 | Cariello | G06F 12/0246 |

* cited by examiner

*Primary Examiner* — Larry T Mackall
(74) *Attorney, Agent, or Firm* — Holland & Hart LLP

(57) ABSTRACT

Methods, systems, and devices for data compression for mapping tables are described. A memory system may store a table that includes mappings between a set of logical block addresses and a set of physical block addresses. The table may be stored to volatile memory of the memory system and each entry may include a subset of physical block addresses and one or more logical block addresses that correspond to the subset of physical block addresses. In some implementations, a quantity of the entries that each include the subset of physical block addresses and the one or more logical block addresses may be determined based on dividing the set of physical block addresses by a factor. Similarly, a size of the entries may be determined based on dividing the set of physical block addresses by the factor.

20 Claims, 5 Drawing Sheets

DATA COMPRESSION FOR MAPPING TABLES

CROSS REFERENCE

The present Application for Patent claims priority to U.S. Patent Application No. 63/459,365 by He et al., entitled "DATA COMPRESSION FOR MAPPING TABLES," filed Apr. 14, 2023, which is assigned to the assignee hereof, and which is expressly incorporated by reference herein.

TECHNICAL FIELD

The following relates to one or more systems for memory, including data compression for mapping tables.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some cases, a memory system may include both non-volatile memory (e.g., NAND memory) and volatile memory (e.g., static random access memory (SRAM)), where the non-volatile memory may include blocks of memory cells that are addressable using a logical block address (LBA) and a physical block address (PBA). The memory system may include a mapping table to store entries that include mappings between LBAs and a respective PBA, such that the memory system may access the entries of the mapping table to perform access operations on the blocks. In some examples, the mapping table may be stored at the volatile memory to provide lower latency associated with accessing the entries of the mapping table. However, many memory systems include less volatile storage than non-volatile storage (e.g., due to volatile memory being more expensive or less space efficient to implement than non-volatile memory). Therefore, it may be desirable to decrease the size of entries stored to a mapping table to reduce the size of the volatile memory or to store a greater quantity of entries to the volatile memory.

In accordance with examples as described herein, a memory system may store a mapping table (e.g., a compressed mapping table) in volatile memory with entries (e.g., compressed entries) that include fewer LBAs than PBAs. For example, each entry may one or more LBAs and a set of PBAs. Compressing the entries of the mapping table in such a manner may decrease an amount of information (e.g., bits) included in mappings between the LBAs and the PBAs. In some cases, the mapping table may support relatively less information stored at the volatile memory while maintaining a capability of accessing (e.g., via the mappings) data stored to a non-volatile memory. In other cases, the mapping table may support a capability of accessing a relatively greater quantity of data (e.g., a greater quantity of entries) while maintaining a same amount of information stored at the volatile memory, among other advantages.

Figure 1:
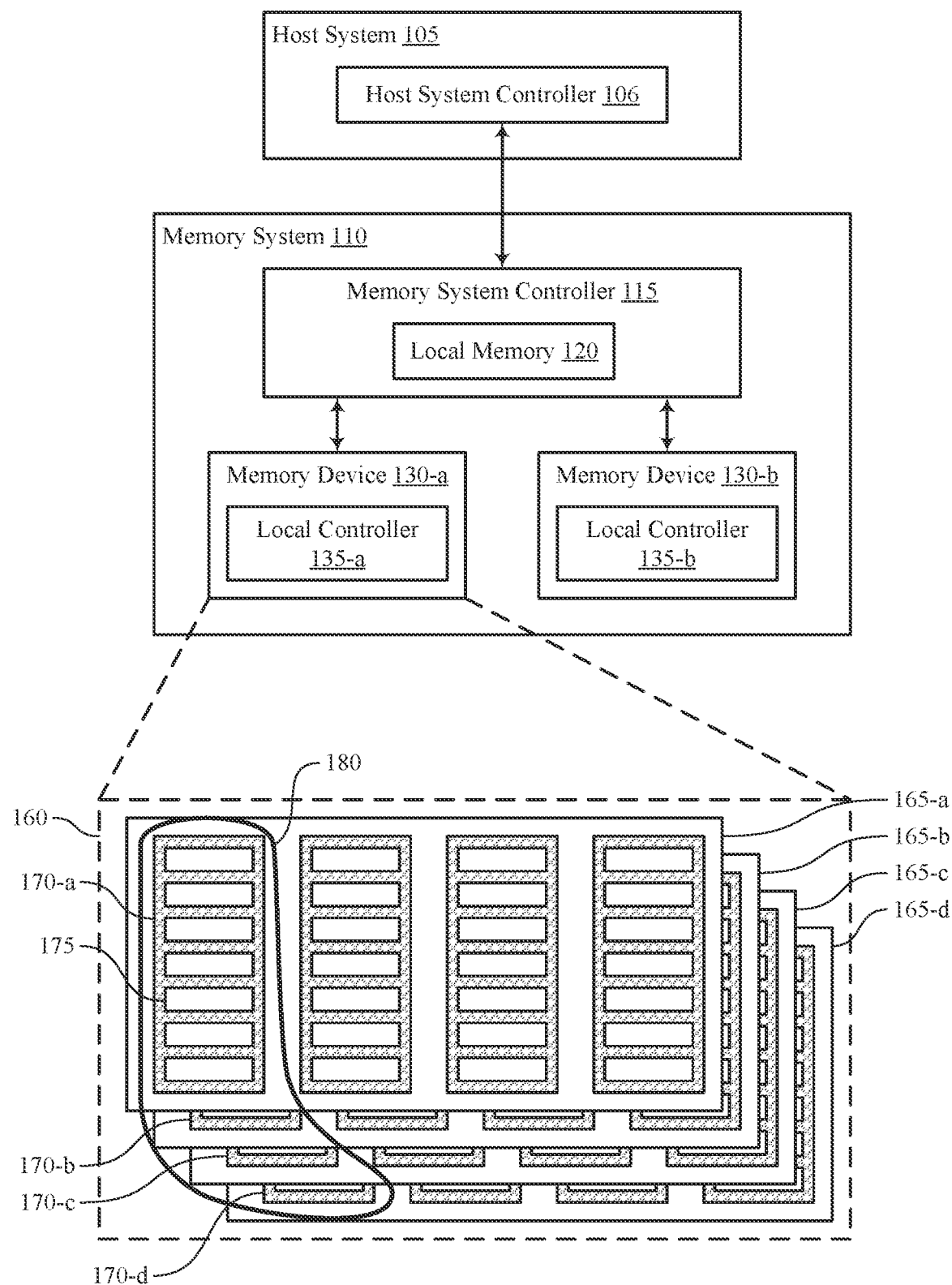
FIG. 1 illustrates an example of a system that supports data compression for mapping tables in accordance with examples as disclosed herein.

Features of the disclosure are initially described in the context of a system with reference to FIG. 1. Features of the disclosure are described in the context of a system and a process flow with reference to FIGS. 2 and 3. These and other features of the disclosure are further illustrated by and described in the context of an apparatus diagram and flowchart that relate to data compression for mapping tables with reference to FIGS. 4 and 5.

FIG. 1 illustrates an example of a system 100 that supports data compression for mapping tables in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between LBAs associated with commands from the host system 105 and PBAs associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the LBA for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support data compression for mapping tables. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples as described herein, the memory system 110 may store a mapping table (e.g., a compressed mapping table) in volatile memory (e.g., the memory device 130-b) with entries (e.g., compressed entries) that include fewer LBAs than PBAs. For example, each entry may one or more LBAs and a set of PBAs. Compressing the entries of the mapping table in such a manner may decrease an amount of information (e.g., bits) included in mappings between the LBAs and the PBAs. In some cases, the mapping table may support relatively less information stored at the volatile memory (e.g., the memory device 130-a) while maintaining a capability of accessing (e.g., via the mappings) data stored to a non-volatile memory. In other cases, the mapping table may support a capability of accessing a relatively greater quantity of data (e.g., a greater quantity of entries) while maintaining a same amount of information stored at the volatile memory.

Figure 2:
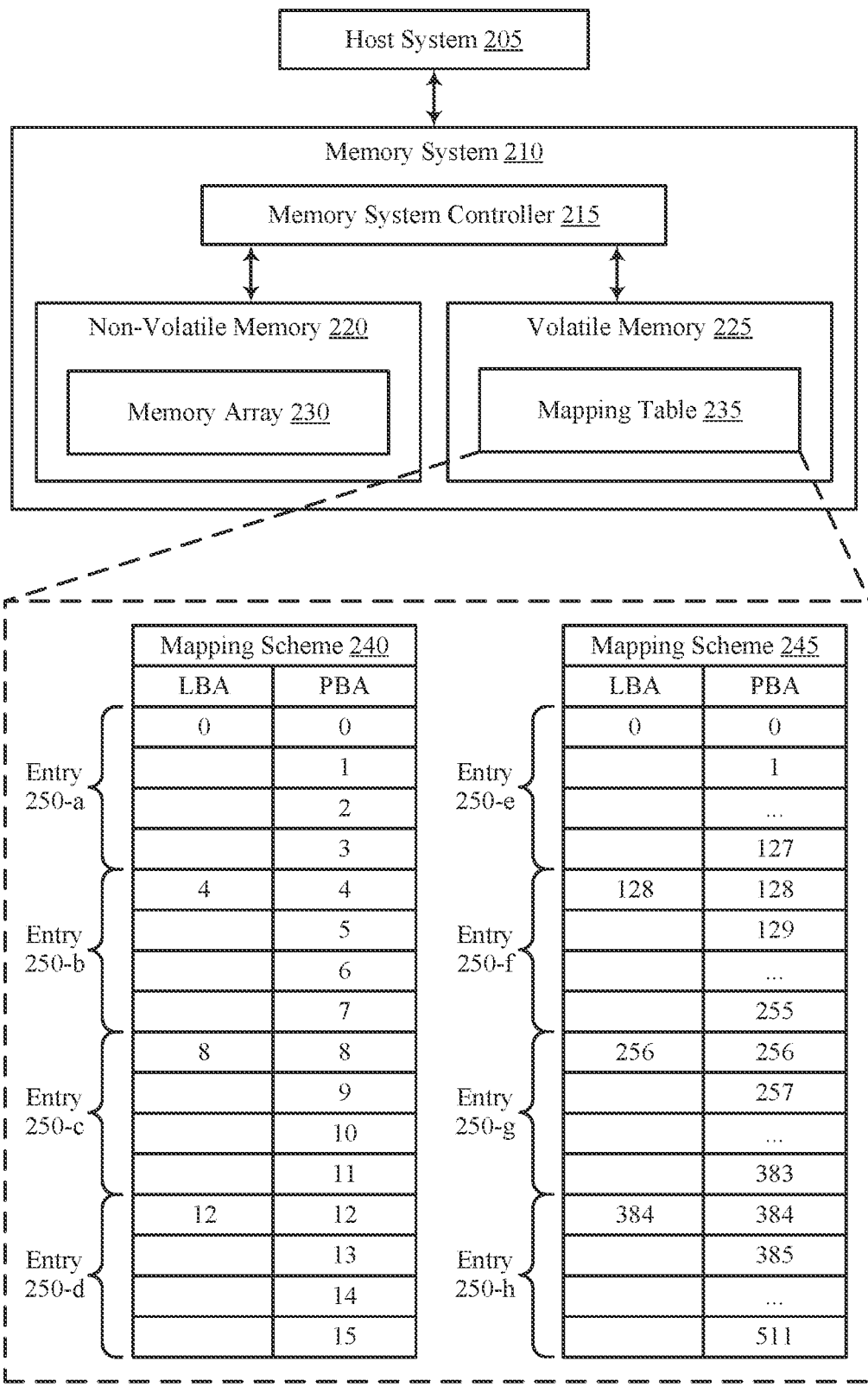
FIG. 2 illustrates an example of a system that supports data compression for mapping tables in accordance with examples as disclosed herein.

FIG. 2 illustrates an example of a system 200 that supports data compression for mapping tables in accordance with examples as disclosed herein. The system 200 may implement aspects of a system 100, as described with reference to FIG. 1. For example, the system 200 may include a host system 205 and a memory system 210, which may be examples of a host system 105 and a memory system 110, as described with reference to FIG. 1, respectively. The system 200 may illustrate an example of a mapping table 235 that includes relatively fewer LBAs than PBAs, thereby supporting relatively less information to store the mapping table 235. In some cases, by storing relatively less information to convey mappings between the LBAs and the PBAs, the system 200 may use relatively less volatile memory 225 to store the mappings, or may be able to store a greater quantity of mappings to the volatile memory 225.

The system 200 may include the memory system 210 operable to communicate with the host system 205 via a memory system controller 215. For example, the memory system controller 215 may be operable to perform operations on the memory system 210 in accordance with commands from the host system 205. The memory system 210 may also include non-volatile memory 220 and volatile memory 225, which may be examples of respective memory devices 130, as described with reference to FIG. 1. The non-volatile memory 220 may include a memory array 230 which may include blocks of non-volatile memory cells (e.g., NAND memory cells). For example, the memory array 230 may include a set of blocks, each block addressable by an LBA and a PBA. The volatile memory 225 may include a memory array (not shown) of volatile memory cells, which may be configured to store a mapping table 235. The mapping table 235 may be an example of an L2P mapping table, such that the mapping table 235 may include mappings between LBAs and PBAs corresponding to the set of blocks in the memory array 230.

In previous implementations, a mapping table may have included direct mappings between a set of LBAs and a set of PBAs corresponding to the set of blocks in the memory array 230. For example, the mapping table may have included entries mapping each LBA to each PBA. In some such examples, each entry may have included a direct mapping from one LBA to one PBA, or a subset of LBAs to a subset of PBAs, where each subset (e.g., the subset of LBAs and the subset of PBAs) may have included an equivalent (e.g., a same) quantity of addresses. Such mapping tables may have included a quantity of bits corresponding to a quantity of LBAs and a quantity of PBAs in the mapping table. For example, storing a set of 16 LBAs and a set of 16 PBAs may have been associated with storing 32 or more bits of information (e.g., at least 16 bits for the set of LBAs and at least 16 bits for the set of PBAs) to the volatile memory 225. In some cases, storing information (e.g., bits of information) to the volatile memory 225 may be relatively disadvantageous, due to volatile memory 225 being relatively expensive or due to needing a relatively large quantity of volatile memory 225 to store mapping entries.

As described herein, the mapping table 235 may include compressed mappings between the set of LBAs and the set of PBAs corresponding to the set of blocks in the memory array 230, which may decrease the quantity of bits involved in storing the set of LBAs and the set of PBAs. The mapping table 235 may include entries 250 (e.g., entries 250-a through 250-h), each mapping a subset of PBAs with one or more LBAs (e.g., a singular LBA) that represents a subset of LBAs corresponding to the subset of PBAs. For example, entry 250-a may include PBAs 0-4 and LBA 0, which may be representative of LBAs 0-4 (e.g., the LBAs 0-4 mapping to the PBAs 0-4). Storing the mapping table 235 where each entry 250 is compressed (e.g., such that each LBA maps to a subset of PBAs) may include storing relatively fewer bits corresponding to a quantity of LBAs and a quantity of PBAs in the mapping table 235. For example, when each entry 250 includes 4 PBAs and one LBA representing 4 LBAs, storing 4 entries 250 for a set of 16 LBAs and a set of 16 PBAs may be associated with storing approximately 20 bits of information (e.g., 4 bits for the set of LBAs and 16 bits for the set of PBAs) to the volatile memory 225. In some cases, storing relatively fewer LBAs than PBAs may include discarding the LBAs from the subsets of LBAs that are not associated with representing the subsets of LBAs.

In some cases, the mapping table 235 may include contiguous LBA entries 250, such that the LBAs associated with the respective entries 250 may be sequentially ordered (e.g., LBA 0, 4, 8, 12). In other cases, the mapping table 235 may include non-contiguous LBA entries 250, such that the LBAs associated with the respective entries 250 may be non-sequentially ordered (e.g., LBA 4, 0, 12, 8). In some cases, the mapping table 235 may include contiguous PBA entries 250, such that the PBAs associated with the respective entries 250 may be sequentially ordered from entry 250-a to entry 250-b. For example, a last PBA of a first entry 250 (e.g., entry 250-a) may be contiguous with a first PBA of a second contiguous subsequent entry 250 (e.g., entry 250-b).

In other cases, the mapping table 235 may include non-contiguous PBA entries 250, such that the PBAs associated with the respective entries 250 may not be sequentially ordered from entry 250-a to entry 250-b. For example, the entry 250-a may include LBA 0, which may be representative of LBAs 0-4 which has values directly corresponding with values of PBAs 0-4 (e.g., 0-4=0-4). However, in other cases, the mapping table 235 may include entries 250 where the subsets do not directly correspond, such that each entry 250 may include one or more LBAs that represent a subset of LBAs with values different than a subset of PBAs. For example, the entry 250-a may include LBA 0, which may be representative of LBAs 0-4, but may include PBAs 4-7.

In some cases, the LBAs associated with each entry 250 may be contiguous, such that LBA 0 may represent LBAs 0-4, ordered: 0, 1, 2, 3. In other cases, the LBAs associated with each entry 250 may be noncontiguous, such that LBA 0 may represent LBAs 0-4, ordered: 0, 3, 1, 2. In some cases, the PBAs associated with each entry 250 may be contiguous, such that the entry 250-a may include PBAs ordered: 0, 1, 2, 3. In other cases, the PBAs associated with each entry 250 may be noncontiguous, such that the entry 250-*a* may include PBAs ordered: 0, 2, 1, 3.

In some cases, the memory system 210 may receive a write command (e.g., a random write command) from the host system 205 including data and a set of LBAs corresponding to a set of blocks of the memory array 230. The memory system 210 may identify a mapping scheme (e.g., a mapping scheme 240, a mapping scheme 245) between a set of PBAs corresponding to a set of blocks and the set of LBAs (e.g., from the write command). In some cases, the memory system 210 may identify the mapping scheme based on a size (e.g., a quantity of LBAs associated with the set of LBAs) of the write command. For example, a quantity of LBAs (e.g., 16 LBAs) in the write command may indicate the write command is a 16K random write, and the memory system 210 may determine to use the mapping scheme 240. Alternatively, a different quantity of LBAs (e.g., 512 LBAs) in the write command may indicate the write command is a 512K random write, and the memory system 210 may determine to use the mapping scheme 245.

The memory system 210 may divide the set of LBAs or the set of PBAs by a factor to generate a quantity of entries 250 and a size of entries 250 in each mapping scheme. In some cases, the mappings may include 4 entries 250 such that the factor is dependent on generating 4 entries 250. For example, when the write command includes the set of 16 LBAs, the memory system 210 may divide the set of 16 LBAs by a factor of 4 to generate 4 entries 250 for the mapping scheme 240, each entry 250 including 4 PBAs (e.g., entry 250-*a*, 250-*b*, 250-*c*, 250-*d*). Alternatively, when the write command includes the set of 512 LBAs, the memory system 210 may divide the set of 512 LBAs by a factor of 128 to generate 4 entries 250 for the mapping scheme 245, each entry 250 including 128 PBAs (e.g., entry 250-*e*, 250-*f*, 250-*g*, 250-*h*). In other cases, the mappings may include a different quantity of entries 250 such that the factor may be dependent on generating the different quantity of entries 250.

In some cases, the memory system 210 may determine a size of the write command does not satisfy a threshold associated with generating the compressed entries 250. For example, the memory system 210 may identify a quantity of LBAs (e.g., 4 LBAs, 8 LBAs) in the write command may indicate the write command is a 4K random write or an 8K random write, and the threshold associated with generating the compressed entries 250 may be associated with a 16K random write. In such cases, the memory system 210 may refrain from generating the compressed entries 250 and may instead generate entries that include direct mappings between the LBAs and the PBAs (e.g., a 1:1 mapping).

After identifying a mapping scheme, the memory system 210 may store the mapping scheme (e.g., the mapping scheme 240 or 245) in the mapping table 235 in the volatile memory 225. In response to storing the mapping scheme, the memory system 210 may write the data to the set of blocks of the memory array 230 using the mapping scheme to identify the PBAs corresponding to the LBAs of the write command.

In some cases, the memory system 210 may receive a read command from the host system 205 including a request for data and an indication of one or more LBAs. In response, the memory system 210 may determine whether the LBA is within one of the entries 250 stored in the mapping table 235. In some examples, the memory system 210 may determine the LBA is not within one of the entries 250 stored in the mapping table 235 and the memory system 210 may select the appropriate entry 250 (e.g., including mappings between the one or more LBAs and one or more corresponding PBAs) from a main L2P table and store the appropriate entry 250 to the volatile memory 225.

In some examples, the memory system 210 may determine that the LBA is associated with (e.g., within) one of the entries 250 stored in the mapping table 235. In some such examples, the memory system 210 may identify an entry 250 from the mapping table 235 storing a representative LBA of a subset of LBAs, where the subset of LBAs includes the LBA indicated by the read command. The memory system 210 may identify a PBA corresponding to the LBA based on determining an offset between a position of the LBA within the subset of LBAs and the representative LBA of the identified entry 250 and applying the offset to a position of a first PBA of the subset of PBAs of the identified entry 250. For example, the memory system 210 may identify that LBA 3, indicated by the read command, is within the entry 250-*a* and determine an offset (e.g., 3 subsequent positions) between the LBA 3 and LBA 0 (e.g., the representative LBA), where the offset may be applied to PBA 0 (e.g., corresponding to the LBA 0) to index PBA 3 (e.g., corresponding to the LBA 3). In some implementations, the LBA indicated by the read command may be a representative LBA of an entry 250, wherein indexing the PBA corresponding to the LBA includes identifying the first PBA of the entry 250. After the PBA is indexed from the mapping table 235, the memory system 210 may read data from the PBA and transmit the data to the host system 205.

In some cases, storing the mapping table 235 to the volatile memory 225 may be relatively less expensive (e.g., when compared to previous implementations) due to decreasing an amount of information (e.g., bits) for store mappings between same sets of LBAs and PBAs. For example, the mapping table 235 may support storing 20 bits of information for a set of 16 LBAs and a set of 16 PBAs (e.g., a 16K random write), whereas a previous implementation of a mapping table may have supported storing at least 32 bits of information for the sets. Therefore, the memory system 210 may benefit from a 1.6 compression ratio (e.g., 32 bits/20 bits) by storing relatively fewer bits to convey the mappings between the same sets of LBAs and PBAs.

In another example, the mapping table 235 may support storing 516 bits of information (e.g., 4 bits for LBAs, 512 bits for PBAs) for a set of 512 LBAs and a set of 512 PBAs (e.g., a 512K random write), whereas a previous implementation of a mapping table may have supported storing 1024 bits of information (e.g., 512 bits for LBAs, 512 bits for PBAs) for the sets. Therefore, the memory system 210 may benefit from a 1.98 compression ratio (e.g., 1024 bits/516 bits) by storing relatively fewer bits to convey the mappings between the same sets of LBAs and PBAs. Therefore, the mapping table 235 may support storing relatively less information while maintaining a capability of accessing (e.g., via the mappings) a same quantity of blocks (e.g., otherwise associated with previous implementations).

In other cases, storing the mapping table 235 to the volatile memory 225 may be relatively more cost effective (e.g., when compared to previous implementations) due to storing a same amount of information for a greater quantity of mappings between LBAs and PBAs. For example, the mapping table 235 may support mappings between 28 LBAs and 28 PBAs due to each entry 250 including a subset of 7 PBAs and a representative LBA, whereas a previous implementation of a mapping table may support storing mappings between 16 LBAs and 16 PBAs due to each entry including a direct mapping between an LBA and a PBA. Thus, storing either mapping table may be associated with storing 32 bits of information, yet the mapping table 235 provides a 1.75 compression ratio (e.g., 28 PBA/16 PBA) compared to previous implementations. Therefore, the mapping table 235 may support a capability of accessing a relatively greater quantity of blocks while maintaining a same amount of information (e.g., otherwise associated with previous implementations) in the volatile memory 225.

Figure 3:
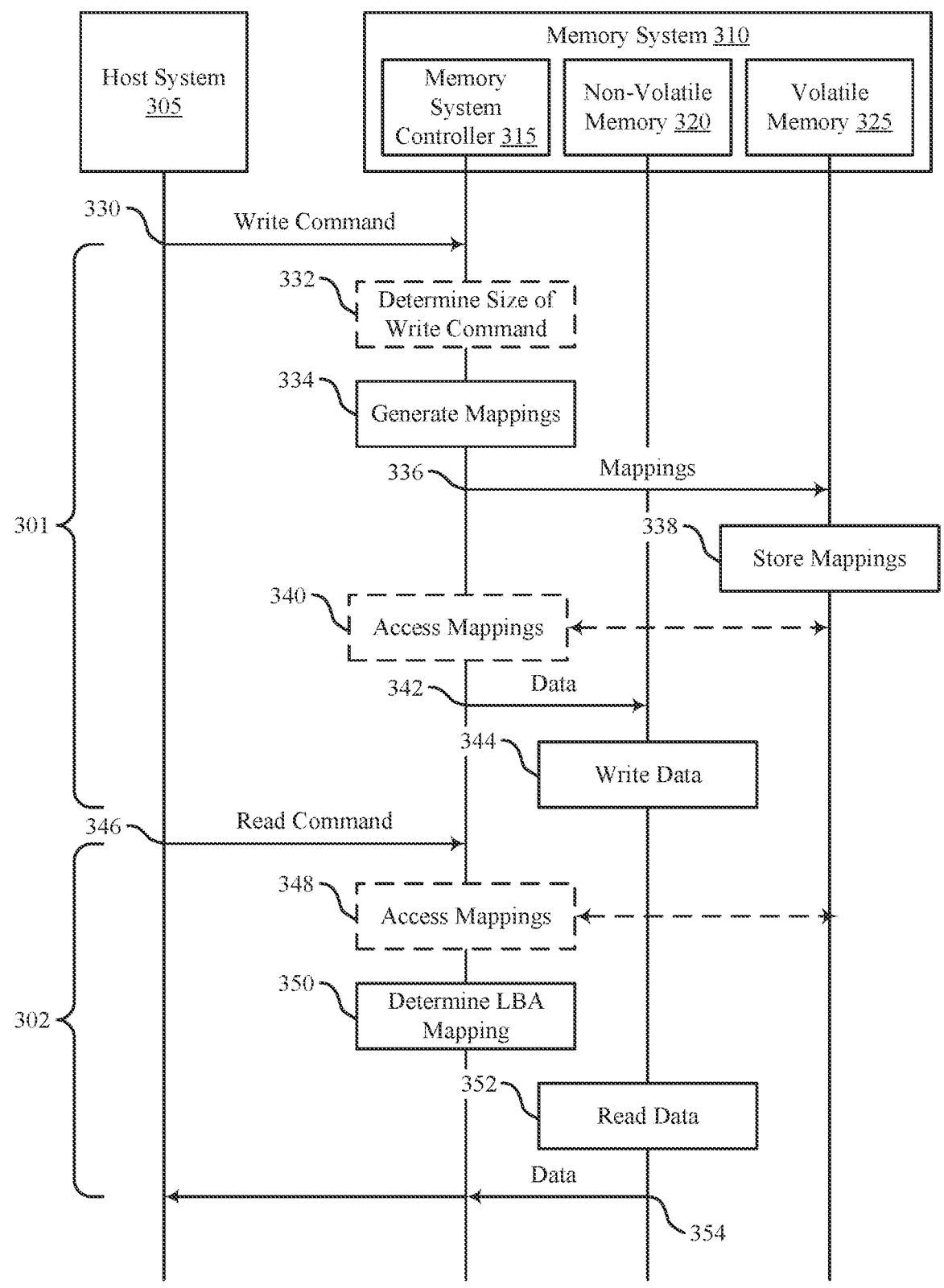
FIG. 3 illustrates an example of a process flow that supports data compression for mapping tables in accordance with examples as disclosed herein.

FIG. 3 illustrates an example of a process flow 300 that supports data compression for mapping tables in accordance with examples as disclosed herein. The process flow 300 may illustrate aspects or operations of the system 200 as described with reference to FIG. 2. For example, the process flow 300 may depict operations at a host system 305 and a memory system 310, which may be examples of a host system 205 and a memory system 210, respectively, as described with reference to FIG. 2.

In the following description of the process flow 300, the methods, techniques, processes, and operations may be performed in different orders or at different times. Further, certain operations may be left out of the process flow 300, or other operations may be added to the process flow 300. In accordance with operations as described herein, the memory system 310 may implement a mapping table with relatively fewer LBAs than PBAs, thereby storing less information to convey a same quantity of mappings (e.g., when compared with previous implementations). Operations 301 may include steps associated with performing a write operation using the mapping table, whereas operations 302 may include steps associated with performing a read operation using the mapping table. In some cases, operations 302 may be performed prior to performing operations 301.

At 330, the host system 305 may transmit a write command to the memory system 310. The memory system 310 may receive the write command at a memory system controller 315, which may be an example of a memory system controller 215, as described with reference to FIG. 2. In some cases, the memory system controller 315 may be associated with performing operations on the memory system 310 in accordance with commands from the host system 305. The write command may include data and a set of LBAs corresponding to a set of blocks within a non-volatile memory 320 of the memory system 310, which may be an example of a non-volatile memory 220, as described with reference to FIG. 2.

At 332, the memory system controller 315 may determine a size of the write command. For example, the memory system controller 315 may determine a quantity of LBAs in the set of LBAs indicated by the write command.

At 334, the memory system controller 315 may generate mappings between the set of LBAs and a set of PBAs corresponding to the set of blocks. The memory system controller 315 may generate the mappings by identifying entries of the mapping table, each entry mapping one or more LBAs representing a subset of LBAs with a subset of PBAs corresponding to the subset of LBAs. In some cases, the quantity of entries may be determined by dividing the set of LBAs by a factor, where the factor may also determine a size of each entry.

At 336, the memory system controller 315 may transmit the mappings to a volatile memory 325, which may be an example of a volatile memory 225, as described with reference to FIG. 2. For example, the memory system controller 315 may transmit the entries associated with the set of LBAs and the set of PBAs to the volatile memory 325 to be stored in the mapping table.

At 338, the volatile memory 325 may store the mappings to the mapping table.

At 340, the memory system controller 315 may access the mappings stored in the volatile memory 325 as part of writing the data to the set of blocks associated with the set of LBAs.

At 342, the memory system controller 315 may transmit the data to the non-volatile memory 320. For example, the memory system controller 315 may transmit the data to the set of blocks corresponding to the set of LBAs indicated by the write command.

At 344, the data may be written to the non-volatile memory 320 in accordance with the mappings. In some cases, the memory system controller 315 may write the data to the set of blocks of the non-volatile memory 320 as part of transmitting the data to the non-volatile memory 320. For example, the memory system controller 315 may write the data to the set of blocks by identifying the set of PBAs corresponding to the set of blocks associated with the set of LBAs indicated from the write command using the mappings.

At 346, the host system 305 may transmit a read command to the memory system 310. The memory system 310 may receive the read command at the memory system controller 315. The read command may include a request for data and an indication of an LBA associated with the data.

At 348, the memory system controller 315 may access mappings stored in the volatile memory 325. For example, the memory system controller 315 may access the mapping table in the volatile memory 325 as part of performing the read operation.

At 350, the memory system controller 315 may determine whether the LBA is included within an entry of the mapping table. In cases where the LBA is not included within an entry of the mapping table, the memory system controller 315 may identify a new entry including the LBA and store the entry to the mapping table at the volatile memory 325. After storing the entry, the memory system controller 315 may identify a PBA corresponding to the LBA from the entry. In cases where the LBA is included within an entry of the mapping table, the memory system controller 315 may identify the PBA corresponding to the LBA from the identified entry based on a position of the LBA and the PBA within the entry. For example, the memory system controller 315 may determine an offset between the position of the LBA and a representative LBA of the entry and apply the offset to a position of the first PBA of the entry to index a PBA corresponding to the LBA.

At 352, the data may be read from the non-volatile memory 320 in accordance with the mappings. For example, the memory system controller 315 may read the data from the non-volatile memory 320 based on identifying the block corresponding to the PBA associated with the LBA indicated by the read command using the mappings.

At 354, the read data may be transmitted from the non-volatile memory 320 to the host system 305. In some cases, the memory system controller 315 may transfer the read data from the non-volatile memory 320 to the host system 305.

Implementing the mapping table as described herein may decrease an amount of information (e.g., bits) to store mappings between the set of LBAs and the set of PBAs. In some cases, the mapping table may support storing relatively less information at the volatile memory 325 while maintaining a capability of accessing (e.g., via the mappings) a same quantity of blocks (e.g., otherwise associated with previous implementations). In other cases, the mapping table may support a capability of accessing a relatively greater quantity of blocks while maintaining a same amount of information stored at the volatile memory 325 (e.g., otherwise associated with previous implementations).

Figure 4:
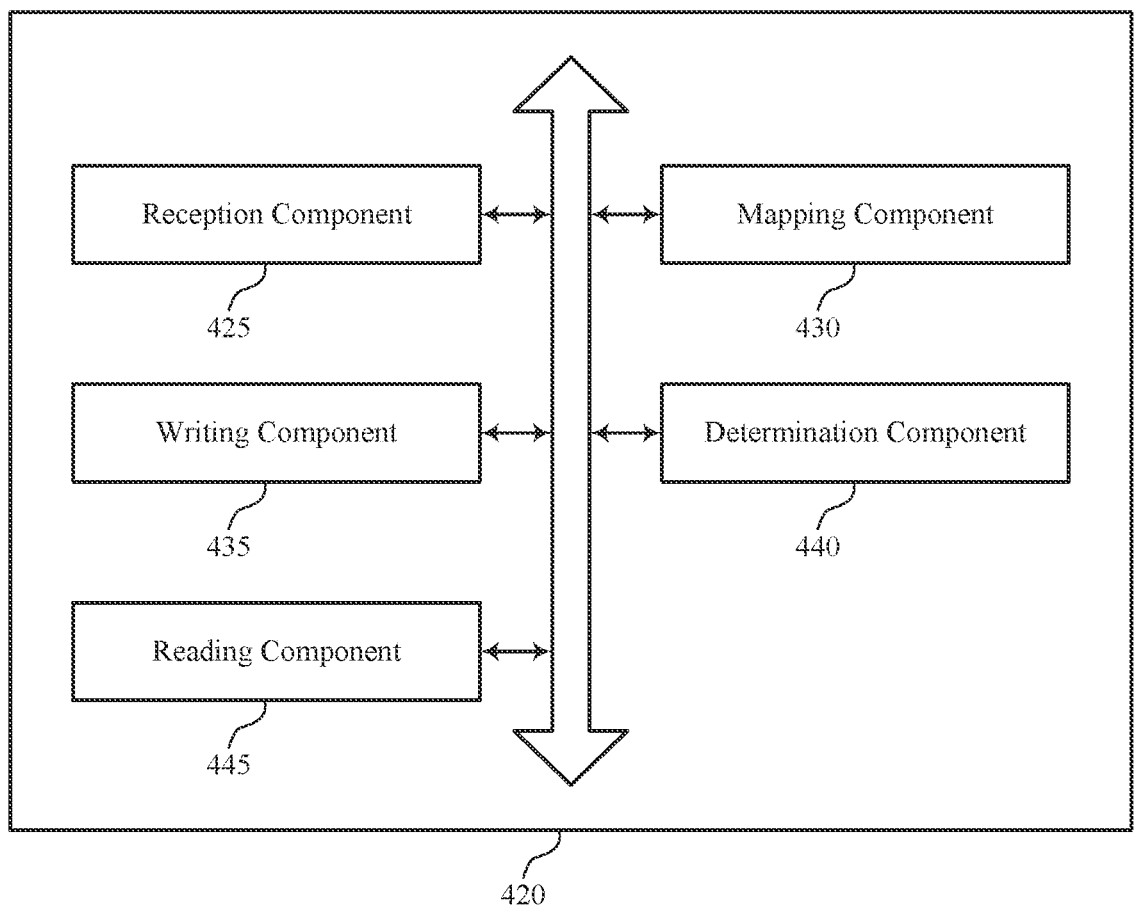
FIG. 4 illustrates a block diagram of a memory system that supports data compression for mapping tables in accordance with examples as disclosed herein.

FIG. 4 illustrates a block diagram 400 of a memory system 420 that supports data compression for mapping tables in accordance with examples as disclosed herein. The memory system 420 may be an example of aspects of a memory system as described with reference to FIGS. 1 through 3. The memory system 420, or various components thereof, may be an example of means for performing various aspects of data compression for mapping tables as described herein. For example, the memory system 420 may include a reception component 425, a mapping component 430, a writing component 435, a determination component 440, a reading component 445, or any combination thereof. Each of these components may communicate, directly or indirectly, with one another (e.g., via one or more buses).

The reception component 425 may be configured as or otherwise support a means for receiving, by a memory system including a volatile memory and a non-volatile memory, a write command including data and a set of logical block addresses associated with the data. The mapping component 430 may be configured as or otherwise support a means for storing, to the volatile memory based at least in part on a first set of physical block addresses and a second set of physical block addresses of the non-volatile memory for writing the data, a first mapping between a first logical block address of the set of logical block addresses and the first set of physical block addresses and a second mapping between a second logical block address of the set of logical block addresses and the second set of physical block addresses. The writing component 435 may be configured as or otherwise support a means for writing the data to the first set of physical block addresses and the second set of physical block addresses based at least in part on storing the first mapping and the second mapping to the volatile memory.

In some examples, the reception component 425 may be configured as or otherwise support a means for receiving, by the memory system, a read command including a request for data associated with a third logical block address. In some examples, the determination component 440 may be configured as or otherwise support a means for determining that the third logical block address is associated with the first mapping based at least in part on receiving the read command. In some examples, the reading component 445 may be configured as or otherwise support a means for reading a physical block address corresponding to the third logical block address based at least in part on determining that the third logical block address is associated with the first mapping.

In some examples, to support determining that the third logical block address is associated with the first mapping, the determination component 440 may be configured as or otherwise support a means for determining that the third logical block address is within a threshold quantity of logical block addresses of the first logical block address.

In some examples, the determination component 440 may be configured as or otherwise support a means for determining an offset between the first logical block address and the third logical block address. In some examples, the determination component 440 may be configured as or otherwise support a means for determining, using the offset, that the physical block address corresponds to the third logical block address.

In some examples, the mapping component 430 may be configured as or otherwise support a means for generating the first mapping between the first logical block address of the set of logical block addresses and the first set of physical block addresses and the second mapping between the second logical block address of the set of logical block addresses and the second set of physical block addresses.

In some examples, to support generating the first mapping and the second mapping, the determination component 440 may be configured as or otherwise support a means for determining a correspondence between a first subset of the set of logical block addresses and the first set of physical block addresses, the first subset of the set of logical block addresses including the first logical block address. In some examples, to support generating the first mapping and the second mapping, the determination component 440 may be configured as or otherwise support a means for determining a correspondence between a second subset of the set of logical block addresses and the second set of physical block addresses, the second subset of the set of logical block addresses including the second logical block address. In some examples, to support generating the first mapping and the second mapping, the mapping component 430 may be configured as or otherwise support a means for discarding one or more logical block addresses from each of the first subset of the set of logical block addresses and the second subset of the set of logical block addresses.

In some examples, the determination component 440 may be configured as or otherwise support a means for determining a size of the write command based at least in part on receiving the write command. In some examples, the determination component 440 may be configured as or otherwise support a means for determining whether the size of the write command satisfies a first threshold value, where storing the first mapping and the second mapping to the volatile memory is based at least in part on the size of the write command satisfying the first threshold value.

In some examples, the first set of physical block addresses and the second set of physical block addresses each include a first quantity of physical block addresses that is based at least in part on the size of the write command satisfying the first threshold value.

In some examples, the determination component 440 may be configured as or otherwise support a means for determining a size of the write command based at least in part on receiving the write command. In some examples, the determination component 440 may be configured as or otherwise support a means for determining whether the size of the write command satisfies a second threshold value, where storing the first mapping and the second mapping to the volatile memory is based at least in part on the size of the write command satisfying the second threshold value.

In some examples, the first set of physical block addresses and the second set of physical block addresses each include a second quantity of physical block addresses that is based at least in part on the size of the write command satisfying the second threshold value.

In some examples, the reception component 425 may be configured as or otherwise support a means for receiving a second write command including second data and a second set of logical block addresses associated with the data. In some examples, the determination component 440 may be configured as or otherwise support a means for determining that a size of the second write command fails to satisfy a third threshold value based at least in part on receiving the second write command. In some examples, the mapping component 430 may be configured as or otherwise support a means for storing, to the volatile memory, a third mapping between the second set of logical block addresses and a third set of physical block addresses of the non-volatile memory.

In some examples, the writing component 435 may be configured as or otherwise support a means for writing the second data to the third set of physical block addresses of the non-volatile memory based at least in part on storing the third mapping to the volatile memory.

In some examples, physical block addresses of the first set of physical block addresses are contiguous physical block addresses. In some examples, physical block addresses of the second set of physical block addresses are contiguous physical block addresses.

In some examples, the physical block addresses of the first set of physical block addresses are non-contiguous with the physical block addresses of the second set of physical block addresses.

In some examples, the write command includes a random write command.

Figure 5:
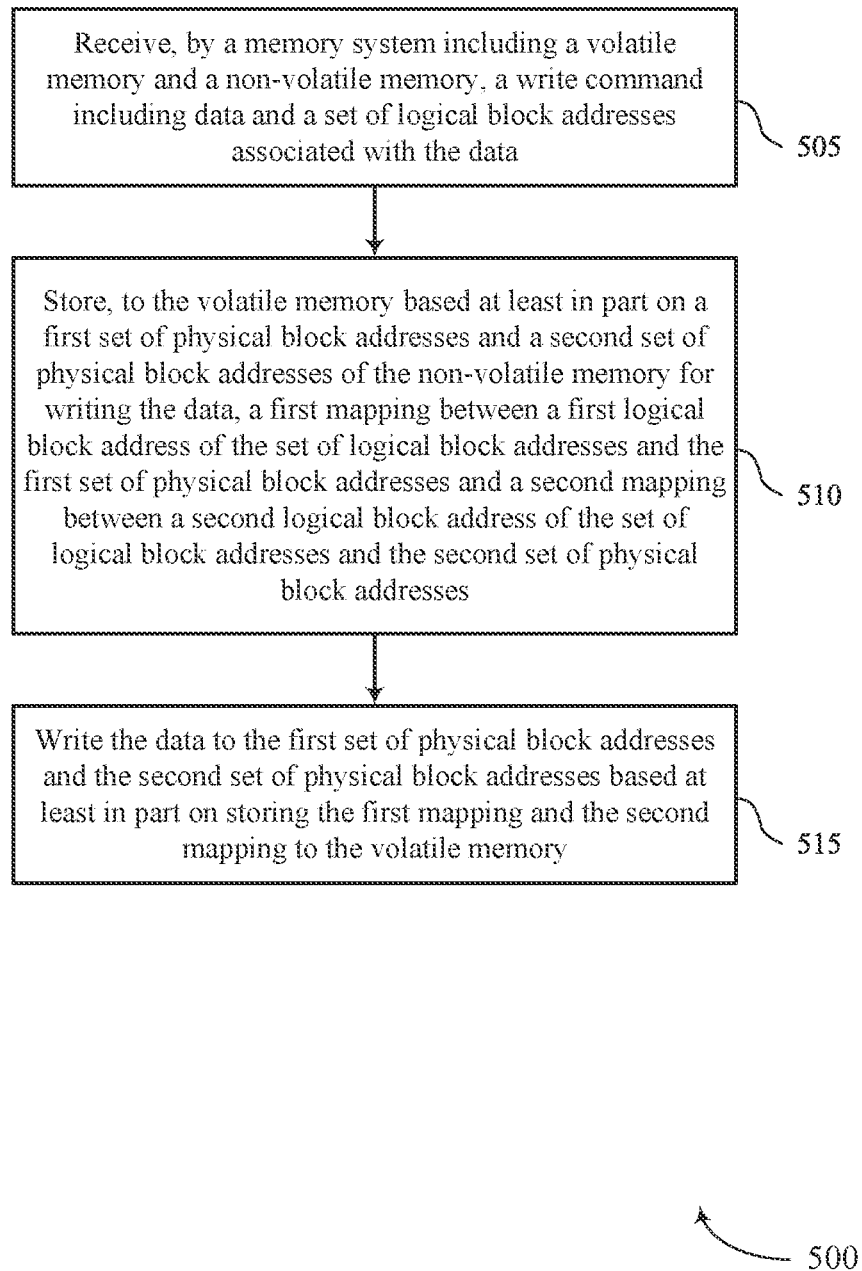
FIG. 5 illustrates a flowchart showing a method or methods that support data compression for mapping tables in accordance with examples as disclosed herein.

FIG. 5 illustrates a flowchart showing a method 500 that supports data compression for mapping tables in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, by a memory system including a volatile memory and a non-volatile memory, a write command including data and a set of logical block addresses associated with the data. The operations of 505 may be performed in accordance with examples as disclosed herein. In some examples, aspects of the operations of 505 may be performed by a reception component 425 as described with reference to FIG. 4.

At 510, the method may include storing, to the volatile memory based at least in part on a first set of physical block addresses and a second set of physical block addresses of the non-volatile memory for writing the data, a first mapping between a first logical block address of the set of logical block addresses and the first set of physical block addresses and a second mapping between a second logical block address of the set of logical block addresses and the second set of physical block addresses. The operations of 510 may be performed in accordance with examples as disclosed herein. In some examples, aspects of the operations of 510 may be performed by a mapping component 430 as described with reference to FIG. 4.

At 515, the method may include writing the data to the first set of physical block addresses and the second set of physical block addresses based at least in part on storing the first mapping and the second mapping to the volatile memory. The operations of 515 may be performed in accordance with examples as disclosed herein. In some examples, aspects of the operations of 515 may be performed by a writing component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a memory system including a volatile memory and a non-volatile memory, a write command including data and a set of logical block addresses associated with the data; storing, to the volatile memory based at least in part on a first set of physical block addresses and a second set of physical block addresses of the non-volatile memory for writing the data, a first mapping between a first logical block address of the set of logical block addresses and the first set of physical block addresses and a second mapping between a second logical block address of the set of logical block addresses and the second set of physical block addresses; and writing the data to the first set of physical block addresses and the second set of physical block addresses based at least in part on storing the first mapping and the second mapping to the volatile memory.

Aspect 2: The method, apparatus, or non-transitory computer-readable medium of aspect 1, further including operations, features, circuitry, logic, means, or instructions, or any combination thereof for receiving, by the memory system, a read command including a request for data associated with a third logical block address; determining that the third logical block address is associated with the first mapping based at least in part on receiving the read command; and reading a physical block address corresponding to the third logical block address based at least in part on determining that the third logical block address is associated with the first mapping.

Aspect 3: The method, apparatus, or non-transitory computer-readable medium of aspect 2, where determining that the third logical block address is associated with the first mapping includes operations, features, circuitry, logic, means, or instructions, or any combination thereof for determining that the third logical block address is within a threshold quantity of logical block addresses of the first logical block address.

Aspect 4: The method, apparatus, or non-transitory computer-readable medium of any of aspects 2 through 3, further including operations, features, circuitry, logic, means, or instructions, or any combination thereof for determining an offset between the first logical block address and the third logical block address and determining, using the offset, that the physical block address corresponds to the third logical block address.

Aspect 5: The method, apparatus, or non-transitory computer-readable medium of any of aspects 1 through 4, further including operations, features, circuitry, logic, means, or instructions, or any combination thereof for generating the first mapping between the first logical block address of the set of logical block addresses and the first set of physical block addresses and the second mapping between the second logical block address of the set of logical block addresses and the second set of physical block addresses.

Aspect 6: The method, apparatus, or non-transitory computer-readable medium of aspect 5, where generating the first mapping and the second mapping includes operations, features, circuitry, logic, means, or instructions, or any combination thereof for determining a correspondence between a first subset of the set of logical block addresses and the first set of physical block addresses, the first subset of the set of logical block addresses including the first logical block address; determining a correspondence between a second subset of the set of logical block addresses and the second set of physical block addresses, the second subset of the set of logical block addresses including the second logical block address; and discarding one or more logical block addresses from each of the first subset of the set of logical block addresses and the second subset of the set of logical block addresses.

Aspect 7: The method, apparatus, or non-transitory computer-readable medium of any of aspects 1 through 6, further including operations, features, circuitry, logic, means, or instructions, or any combination thereof for determining a size of the write command based at least in part on receiving the write command and determining whether the size of the write command satisfies a first threshold value, where storing the first mapping and the second mapping to the volatile memory is based at least in part on the size of the write command satisfying the first threshold value.

Aspect 8: The method, apparatus, or non-transitory computer-readable medium of aspect 7, where the first set of physical block addresses and the second set of physical block addresses each include a first quantity of physical block addresses that is based at least in part on the size of the write command satisfying the first threshold value.

Aspect 9: The method, apparatus, or non-transitory computer-readable medium of any of aspects 1 through 8, further including operations, features, circuitry, logic, means, or instructions, or any combination thereof for determining a size of the write command based at least in part on receiving the write command and determining whether the size of the write command satisfies a second threshold value, where storing the first mapping and the second mapping to the volatile memory is based at least in part on the size of the write command satisfying the second threshold value.

Aspect 10: The method, apparatus, or non-transitory computer-readable medium of aspect 9, where the first set of physical block addresses and the second set of physical block addresses each include a second quantity of physical block addresses that is based at least in part on the size of the write command satisfying the second threshold value.

Aspect 11: The method, apparatus, or non-transitory computer-readable medium of any of aspects 1 through 10, further including operations, features, circuitry, logic, means, or instructions, or any combination thereof for receiving a second write command including second data and a second set of logical block addresses associated with the data; determining that a size of the second write command fails to satisfy a third threshold value based at least in part on receiving the second write command; storing, to the volatile memory, a third mapping between the second set of logical block addresses and a third set of physical block addresses of the non-volatile memory; and writing the second data to the third set of physical block addresses of the non-volatile memory based at least in part on storing the third mapping to the volatile memory.

Aspect 12: The method, apparatus, or non-transitory computer-readable medium of any of aspects 1 through 11, where physical block addresses of the first set of physical block addresses are contiguous physical block addresses and physical block addresses of the second set of physical block addresses are contiguous physical block addresses.

Aspect 13: The method, apparatus, or non-transitory computer-readable medium of any of aspects 1 through 12, where the physical block addresses of the first set of physical block addresses are non-contiguous with the physical block addresses of the second set of physical block addresses.

Aspect 14: The method, apparatus, or non-transitory computer-readable medium of any of aspects 1 through 13, where the write command includes a random write command.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system comprising a volatile memory and a non-volatile memory; and
   a controller coupled with the memory system, wherein the controller is configured to cause the apparatus to:
   receive, by the memory system, a write command comprising data and a set of logical block addresses associated with the data;
   store, to the volatile memory based at least in part on a first set of physical block addresses and a second set of physical block addresses of the non-volatile memory for writing the data, a first mapping between a first logical block address of the set of logical block addresses and the first set of physical block addresses and a second mapping between a second logical block address of the set of logical block addresses and the second set of physical block addresses; and
   write the data to the first set of physical block addresses and the second set of physical block addresses based at least in part on storing the first mapping and the second mapping to the volatile memory.

2. The apparatus of claim 1, wherein the controller is further configured to cause the apparatus to:
   receive, by the memory system, a read command comprising a request for data associated with a third logical block address;
   determine that the third logical block address is associated with the first mapping based at least in part on receiving the read command; and
   read a physical block address corresponding to the third logical block address based at least in part on determining that the third logical block address is associated with the first mapping.

3. The apparatus of claim 2, wherein determining that the third logical block address is associated with the first mapping is configured to cause the apparatus to:
   determine that the third logical block address is within a threshold quantity of logical block addresses of the first logical block address.

4. The apparatus of claim 2, wherein the controller is further configured to cause the apparatus to:
   determine an offset between the first logical block address and the third logical block address; and
   determine, using the offset, that the physical block address corresponds to the third logical block address.

5. The apparatus of claim 1, wherein the controller is further configured to cause the apparatus to:
   generate the first mapping between the first logical block address of the set of logical block addresses and the first set of physical block addresses and the second mapping between the second logical block address of the set of logical block addresses and the second set of physical block addresses.

6. The apparatus of claim 5, wherein generating the first mapping and the second mapping is configured to cause the apparatus to:
   determine a correspondence between a first subset of the set of logical block addresses and the first set of physical block addresses, the first subset of the set of logical block addresses including the first logical block address;
   determine a correspondence between a second subset of the set of logical block addresses and the second set of physical block addresses, the second subset of the set of logical block addresses including the second logical block address; and
   discard one or more logical block addresses from each of the first subset of the set of logical block addresses and the second subset of the set of logical block addresses.

7. The apparatus of claim 1, wherein the controller is further configured to cause the apparatus to:
   determine a size of the write command based at least in part on receiving the write command; and
   determine whether the size of the write command satisfies a first threshold value, wherein storing the first mapping and the second mapping to the volatile memory is based at least in part on the size of the write command satisfying the first threshold value.

8. The apparatus of claim 7, wherein the first set of physical block addresses and the second set of physical block addresses each comprise a first quantity of physical block addresses that is based at least in part on the size of the write command satisfying the first threshold value.

9. The apparatus of claim 1, wherein the controller is further configured to cause the apparatus to:
   determine a size of the write command based at least in part on receiving the write command; and
   determine whether the size of the write command satisfies a second threshold value, wherein storing the first mapping and the second mapping to the volatile memory is based at least in part on the size of the write command satisfying the second threshold value.

10. The apparatus of claim 9, wherein the first set of physical block addresses and the second set of physical block addresses each comprise a second quantity of physical block addresses that is based at least in part on the size of the write command satisfying the second threshold value.

11. The apparatus of claim 1, wherein the controller is further configured to cause the apparatus to:
    receive a second write command comprising second data and a second set of logical block addresses associated with the data;
    determine that a size of the second write command fails to satisfy a third threshold value based at least in part on receiving the second write command;

store, to the volatile memory, a third mapping between the second set of logical block addresses and a third set of physical block addresses of the non-volatile memory; and write the second data to the third set of physical block addresses of the non-volatile memory based at least in part on storing the third mapping to the volatile memory.

12. The apparatus of claim 1, wherein:

physical block addresses of the first set of physical block addresses are contiguous physical block addresses; and physical block addresses of the second set of physical block addresses are contiguous physical block addresses.

13. The apparatus of claim 1, wherein physical block addresses of the first set of physical block addresses are non-contiguous with physical block addresses of the second set of physical block addresses.

14. The apparatus of claim 1, wherein the write command comprises a random write command.

15. A non-transitory computer-readable medium storing code comprising instructions which, when executed by a processor of an electronic device, cause the electronic device to:

receive, by a memory system comprising a volatile memory and a non-volatile memory, a write command comprising data and a set of logical block addresses associated with the data;

store, to the volatile memory based at least in part on a first set of physical block addresses and a second set of physical block addresses of the non-volatile memory for writing the data, a first mapping between a first logical block address of the set of logical block addresses and the first set of physical block addresses and a second mapping between a second logical block address of the set of logical block addresses and the second set of physical block addresses; and write the data to the first set of physical block addresses and the second set of physical block addresses based at least in part on storing the first mapping and the second mapping to the volatile memory.

16. The non-transitory computer-readable medium of claim 15, wherein the instructions, when executed by the processor of the electronic device, further cause the electronic device to:

receive, by the memory system, a read command comprising a request for data associated with a third logical block address;

determine that the third logical block address is associated with the first mapping based at least in part on receiving the read command; and read a physical block address corresponding to the third logical block address based at least in part on determining that the third logical block address is associated with the first mapping.

17. The non-transitory computer-readable medium of claim 16, wherein the instructions, when executed by the processor of the electronic device, further cause the electronic device to:

determine an offset between the first logical block address and the third logical block address; and determine, using the offset, that the physical block address corresponds to the third logical block address.

18. The non-transitory computer-readable medium of claim 15, wherein the instructions, when executed by the processor of the electronic device, further cause the electronic device to:

determine a size of the write command based at least in part on receiving the write command; and determine whether the size of the write command satisfies a first threshold value, wherein storing the first mapping and the second mapping to the volatile memory is based at least in part on the size of the write command satisfying the first threshold value.

19. The non-transitory computer-readable medium of claim 18, wherein the first set of physical block addresses and the second set of physical block addresses each comprise a first quantity of physical block addresses that is based at least in part on the size of the write command satisfying the first threshold value.

20. A method, comprising:

receiving, by a memory system comprising a volatile memory and a non-volatile memory, a write command comprising data and a set of logical block addresses associated with the data;

storing, to the volatile memory based at least in part on a first set of physical block addresses and a second set of physical block addresses of the non-volatile memory for writing the data, a first mapping between a first logical block address of the set of logical block addresses and the first set of physical block addresses and a second mapping between a second logical block address of the set of logical block addresses and the second set of physical block addresses; and writing the data to the first set of physical block addresses and the second set of physical block addresses based at least in part on storing the first mapping and the second mapping to the volatile memory.

* * * * *